US012344216B2

(12) United States Patent
Ito

(10) Patent No.: US 12,344,216 B2
(45) Date of Patent: Jul. 1, 2025

(54) VEHICLE STOP HOLDING DEVICE

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 107 days.

(21) Appl. No.: 18/526,751

(22) Filed: Dec. 1, 2023

(65) Prior Publication Data

US 2024/0239311 A1 Jul. 18, 2024

(30) Foreign Application Priority Data

Jan. 13, 2023 (JP) .................. 2023-003877

(51) Int. Cl.
*B60T 7/12* (2006.01)
*B60T 8/88* (2006.01)
*B60W 10/18* (2012.01)
*B60W 30/18* (2012.01)
*B60W 50/14* (2020.01)

(52) U.S. Cl.
CPC .............. *B60T 7/12* (2013.01); *B60T 8/885* (2013.01); *B60W 10/18* (2013.01); *B60W 30/18118* (2013.01); *B60W 50/14* (2013.01)

(58) Field of Classification Search
CPC ..... B60T 7/12; B60T 7/22; B60T 8/17; B60T 8/48; B60T 8/885; B60T 8/88; B60W 10/18; B60W 50/14; B60W 60/0053; B60W 30/18118

See application file for complete search history.

(56) References Cited

U.S. PATENT DOCUMENTS

| 4,646,903 A * | 3/1987 | Han ................ B60W 10/04 477/194 |
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,358,120 B2 * | 7/2019 | Takase ............... B60T 13/142 |

(Continued)

FOREIGN PATENT DOCUMENTS

JP 4788354 B2 10/2011

*Primary Examiner* — George C Jin
(74) *Attorney, Agent, or Firm* — Sughrue Mion, PLLC

(57) ABSTRACT

The vehicle stop holding device that holds the stop of the vehicle and includes an ECU. The ECU configured to execute takeover control for taking over the operation of a brake device to a driver after the ECU stops the vehicle by the brake device in case where it is determined that the backup control for holding the stop state of the vehicle by a brake holding device cannot be realized and the getting-off operation by the driver is detected, and to execute takeover control after the ECU stops the vehicle by the brake device when a grace time required for the takeover control elapses from a reference time after a determination in case where it is determined that the backup control for holding the stop state of the vehicle by the brake holding device cannot be realized and the getting-off operation by the driver is not detected.

7 Claims, 5 Drawing Sheets

(56) References Cited

U.S. PATENT DOCUMENTS

| | | | | |
|---|---|---|---|---|
| 10,486,698 B2* | 11/2019 | Masui | .................... | B60W 30/16 |
| 2016/0297415 A1* | 10/2016 | Kato | .................... | F02D 41/065 |
| 2016/0332627 A1* | 11/2016 | Yoon | ................ | B60W 30/18118 |
| 2016/0339888 A1* | 11/2016 | Yokoyama | .............. | F16D 65/18 |
| 2019/0295419 A1 | 9/2019 | Tosa et al. | | |
| 2024/0116481 A1* | 4/2024 | Förster | .................... | B60T 8/172 |
| 2024/0157921 A1* | 5/2024 | Marx | ........................ | B60T 8/30 |

* cited by examiner

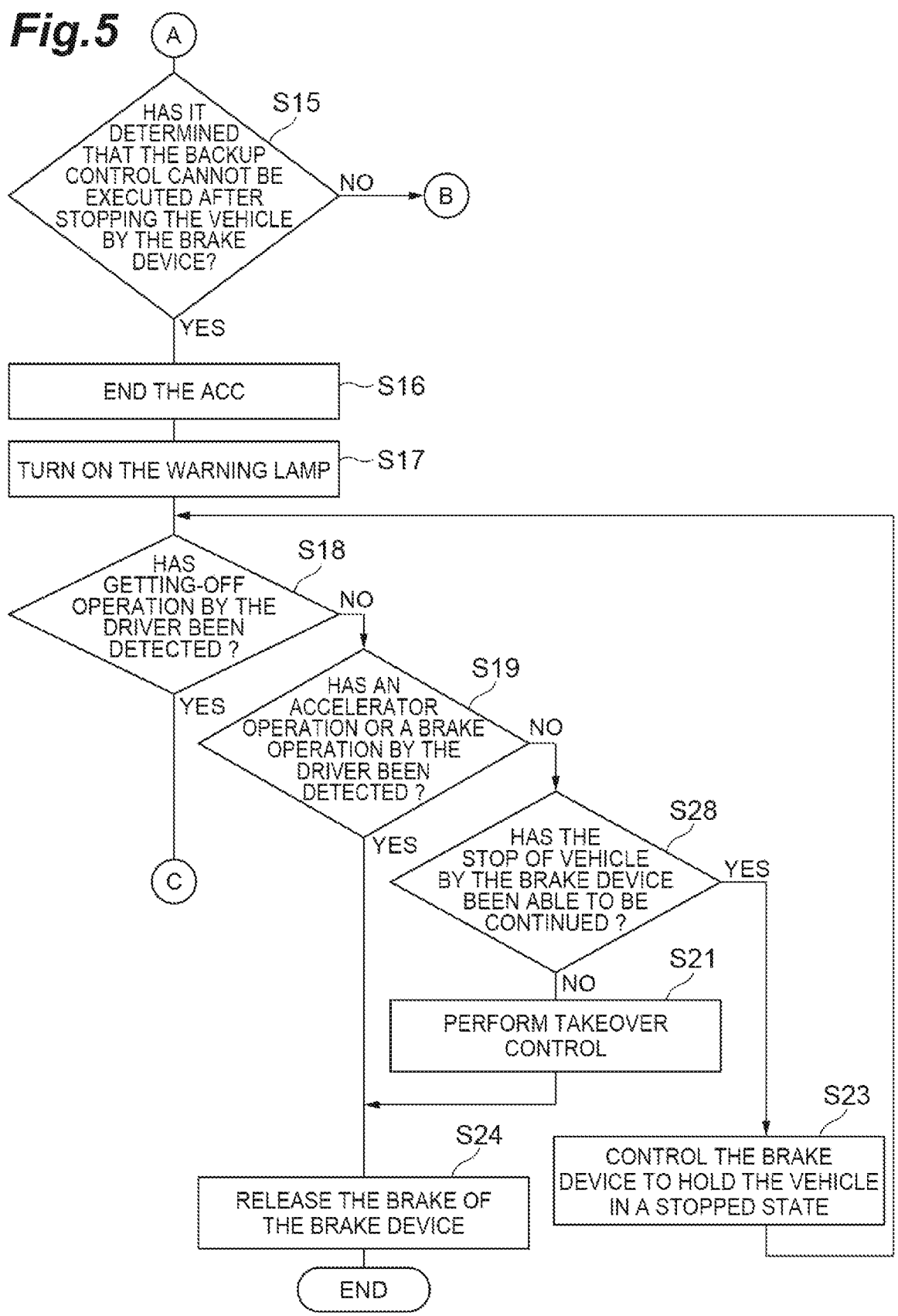

VEHICLE STOP HOLDING DEVICE

TECHNICAL FIELD

The present disclosure relates to a vehicle stop holding device.

BACKGROUND

For example, Japanese Patent No. 4788354 discloses a travel control device in which, when an abnormal condition is detected in a stop holding device during stopping of a vehicle, holding stopping of the vehicle is performed by a hydraulic brake until a driver operates a brake.

SUMMARY

In the vehicle stop holding device as described above, when the hydraulic brake reaches the limit after the driver gets off the vehicle without performing the brake operation, there is a possibility that the stop holding state of the vehicle cannot be maintained.

Accordingly, it is an object of one aspect of the present disclosure to provide a vehicle stop holding device capable of reliably maintaining a stop holding state of a vehicle.

A vehicle stop holding device according to one aspect of the present disclosure is a vehicle stop holding device for holding a stop of a vehicle includes a controller configured to execute takeover control for taking over an operation of a brake device to a driver after the control device stops the vehicle by the brake in case where it is determined that the backup control cannot be realized and the getting-off operation by the driver is detected, and to execute the take-over control after the control device stops the vehicle by the brake when the grace time required for the take-over control elapses from the reference time after a determination in case where it is determined that the backup control cannot be realized and the getting-off operation by the driver is not detected.

In the vehicle stop holding device according to one aspect of the present disclosure, the controller configured to control a braking force applied to the vehicle by the brake device in the takeover control, to change the braking force in a first pattern in the takeover control after the controller stops the vehicle by the brake device, and to change the braking force in a second pattern different from the first pattern in the takeover control before the controller stops the vehicle by the brake device.

According to an aspect of the present disclosure, it is possible to provide a vehicle stop holding device capable of reliably maintaining a stop holding state of a vehicle.

BRIEF DESCRIPTION OF THE DRAWINGS

FIG. 5 is a flowchart illustrating another example of the process of maintaining the stop of the vehicle.

DETAILED DESCRIPTION

Hereinafter, embodiments of the present disclosure will be described in detail with reference to the drawings.

Figure 1:
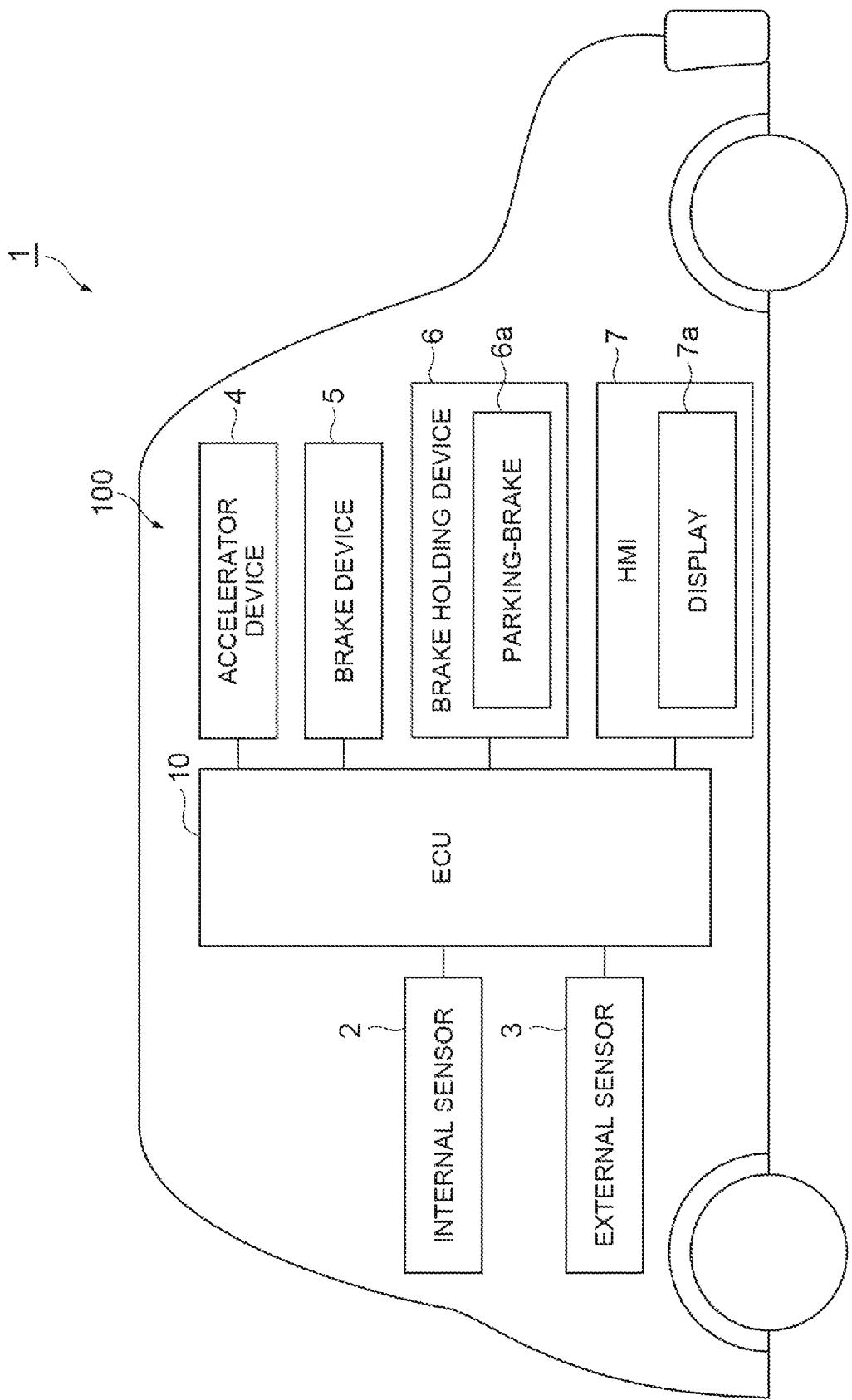
FIG. 1 is a block diagram showing a vehicle stop holding device according to the present embodiment.

FIG. 1 is a block diagram showing a vehicle stop holding device 100 according to the present embodiment. The vehicle stop holding device 100 illustrated in FIG. 1 is a device that holds the stop of the vehicle 1 when the vehicle 1 stops. The vehicle 1 is not particularly limited, and may be various devices.

The vehicle stop holding device 100 includes an electronic control unit (ECU) 10 (controller) that integrally controls the system. The ECU10 is the electronic control unit including a central processing unit (CPU), a read only memory (ROM), a random access memory (RAM), and a controller area network (CAN) and a communication circuit or the like. In the ECU10, for example, a program stored in the ROM is loaded into the RAM, and the program loaded into the RAM is executed by the CPU to implement various functions.

The ECU10 may be comprised of a plurality of electronic units. Some of the functions of the ECU10 described below may be executed by servers capable of communicating with vehicles. The functional configuration and processing of the ECU10 will be described in detail later. An internal sensor 2, an external sensor 3, an accelerator device 4, a brake device 5, a brake holding device 6, and a human machine interface (HMI) 7 is connected to the ECU10.

The internal sensor 2 is a detection device that detects a traveling state of the vehicle 1 and a state inside the vehicle 1. The internal sensor 2 transmits the detection result to the ECU10. The internal sensor 2 includes an accelerator sensor and a brake sensor. The accelerator sensor detects an operation amount of the accelerator device 4 by the driver and transmits the detected operation amount to the ECU10. The brake sensor detects an operation amount of the brake device 5 by the driver and transmits the detected operation amount to the ECU10.

The internal sensor 2 includes a sensor that detects a getting-off operation by the driver. The getting-off operation is an operation for the occupant riding on the vehicle 1 to get off the vehicle 1. For example, the internal sensor 2 includes a seat belt sensor that detects an operation of releasing a seat belt as a getting-off operation, a door opening/closing sensor that detects an operation of opening a door as a getting-off operation, and the like. Note that the operation for opening the door may be, for example, an operation of opening a key of the door (unlocking operation), or may be another operation other than the above. Further, the internal sensor 2 may include a vehicle speed sensor, an accelerometer, and a yaw rate sensor.

The external sensor 3 is a detection device for detecting an obstacle or the like around the vehicle 1. The external sensor 3 transmits the detection result to the ECU10. The external sensor 3 includes at least one of a camera, a radar, and Laser Imaging Detection and Ranging (LIDAR).

The accelerator device 4 operates a driving device such as a motor or an engine. The accelerator device 4 is controlled by, for example, a driver or a ECU10. The brake device 5 controls the braking force applied to the wheels of the vehicle 1. The brake device 5 is, for example, a hydraulic brake. The brake device 5 is controlled by a driver or a ECU10, for example.

The brake holding device 6 holds the stopped state of the vehicle 1. The brake holding device 6 is controlled, for example, by a driver or a ECU10. As an example, the brake holding device 6 controls the parking-brake 6a in response to a control signal from the ECU10, and operates or releases the parking-brake 6a. The park brake 6a may be, for example, an electric park brake (EPB).

The HMI7 is an interface for transmitting and inputting information between an occupant (for example, a driver) of the vehicle 1 and the vehicle stop holding device 100. The HMI7 includes a display 7a that displays image information to the occupant, a speaker that transmits sound to the occupant, or the like. In response to a control signal from the ECU10, the HMI7 displays image information on the display 7a and transmits sound through a speaker.

The ECU10 controls the accelerator device 4, the brake device 5, the brake holding device 6, and the HMI7 based on the detection results of the internal sensor 2 and the external sensor 3, and executes the following control.

The ECU10 performs vehicle speed adjustment support of the vehicles 1. The vehicle speed adjustment support is driving support for automatically adjusting the vehicle speed of the vehicle 1 according to the surrounding environment of the vehicle 1 and the traveling state of the vehicle 1. The vehicle speed adjustment assistance is, for example, adaptive cruise control (ACC). The ACC is, for example, control for performing constant speed control in which the vehicle 1 travels at a constant speed set in advance when there is no preceding vehicle in front of the vehicle 1. The ACC is, for example, a follow-up control that adjusts the vehicle speed of the vehicle 1 so that the distance between the vehicle 1 and a preceding vehicle becomes a predetermined set distance when the preceding vehicle is present in front of the vehicle 1. In the ACC, it is possible to travel or stop the vehicle 1 so as to follow the preceding vehicle in cooperation with a brake hold function which is a function of operating the brake device 5 to apply automatic braking.

The ECU10 executes backup control for holding the stopped state of the vehicle 1 by the brake holding device 6. To be specific, in the backup control, the ECU10 executes control for operating the parking-brake 6a. For example, when the electric parking brake is mounted (set) in the vehicle 1, the ECU10 operates the electric parking brake in the backup control. For example, in a case where the vehicle 1 is mounted (set) with a shift by wire (SBW), the ECU10 operates an automatic P lock (automatic parking lock) in the backup control.

The ECU10 determines whether or not the backup control can be realized by the brake holding device 6. The case where the backup control cannot be realized may be, for example, a case where the parking-brake 6a has failed. Further, for example, the case where the backup control cannot be realized may be a case where the stopped state of the vehicle 1 cannot be maintained by the brake device 5 when the vehicle 1 is stopped on a steep slope. The case where the backup control cannot be realized may be a case other than the above case.

The ECU10 performs takeover control (brake operation handover control) for taking over (changing) the operation of the brake device 5 to the driver. When the ECU10 determines that the backup control cannot be implemented before the ECU10 stops the vehicle 1 by the brake device 5, the ECU10 executes the takeover control. In this takeover control, the ECU10 changes the braking force of the brake device 5 in a predetermined pattern.

After the ECU10 stops the vehicle 1 by the brake device 5 in case where the ECU10 determines that the backup control cannot be realized and detects the getting-off operation by the driver, the ECU10 executes the takeover control. In this takeover control, the ECU10 changes the braking force of the brake device 5 in a first pattern. For example, the ECU10 gradually reduces the braking force of the brake device 5 to 0.

After the ECU10 stops the vehicle 1 by the brake device 5, the takeover control is executed when the grace time required for the takeover control elapses from the reference time after a determination in case where the ECU10 determines that the backup control cannot be realized and does not detect the getting-off operation by the driver. In this takeover control, the ECU10 changes the braking force of the brake device 5 in a second pattern. For example, the ECU10 repeatedly increases and decreases the braking force of the brake device 5. The second pattern may be any pattern as long as the driver's attention is directed to the driving operation when the braking force of the brake device 5 is changed in the pattern.

The ECU10 notifies the driver of the remaining time until the grace time elapses. The ECU10 executes the notification requesting the brake operation while displaying the remaining time on the display 7a in a countdown manner, for example. The ECU10 may notify the driver of the remaining time by voice through, for example, a speaker.

Figure 2:
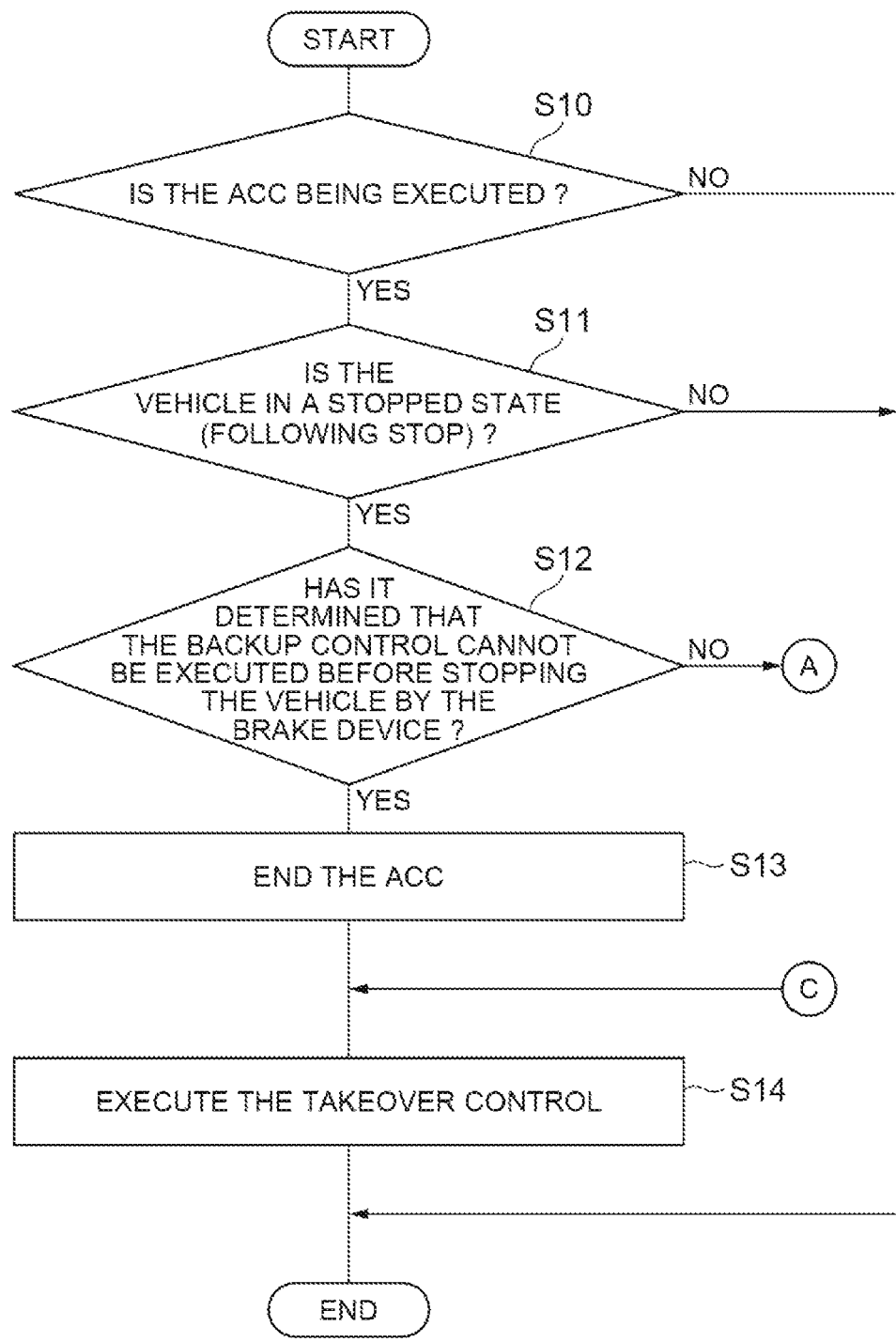
FIG. 2 is a flowchart illustrating an example of a process of maintaining the stop of the vehicle.
Figure 3:
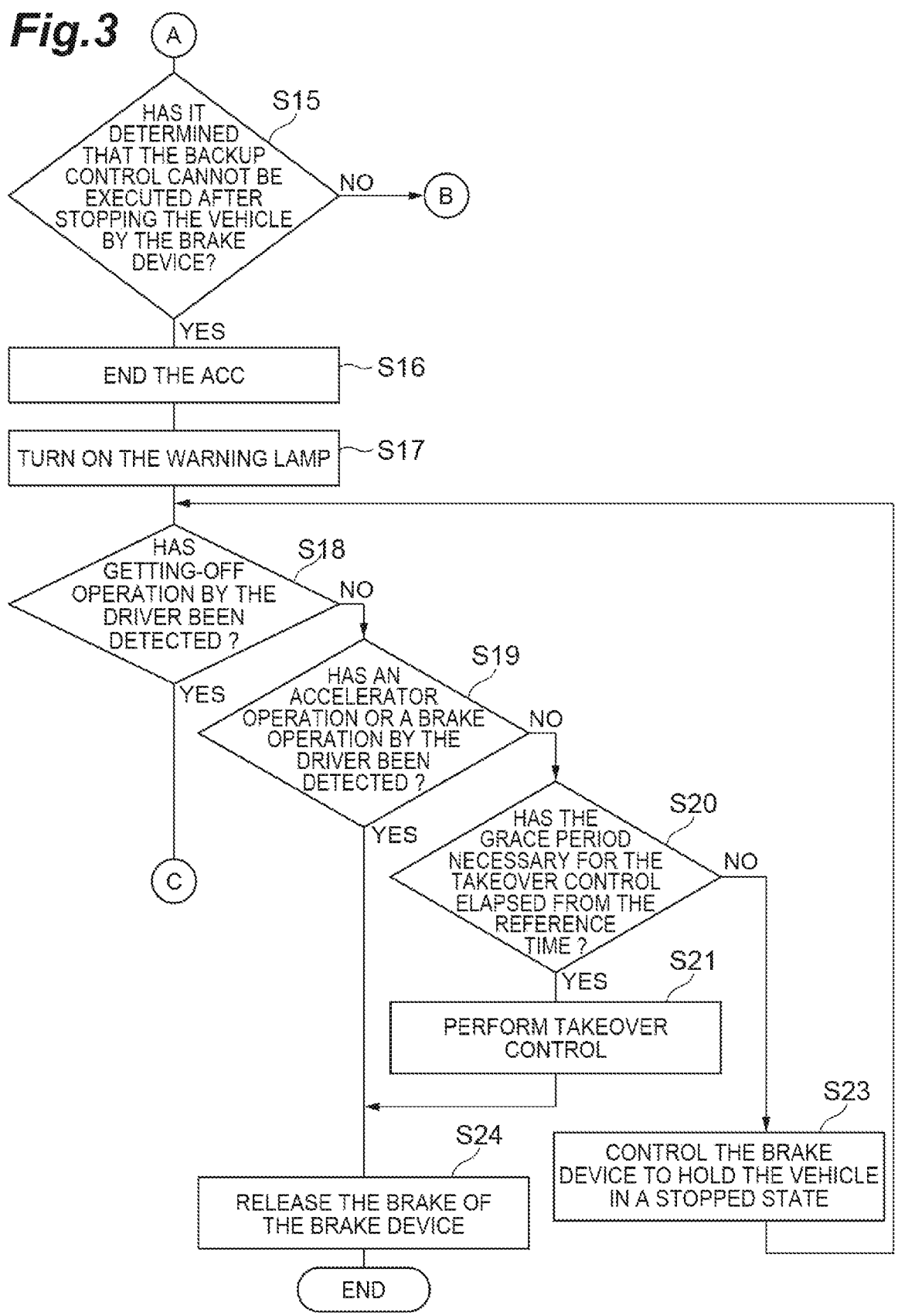
FIG. 3 is a flowchart illustrating an example of a process of maintaining the stop of the vehicle.
Figure 4:
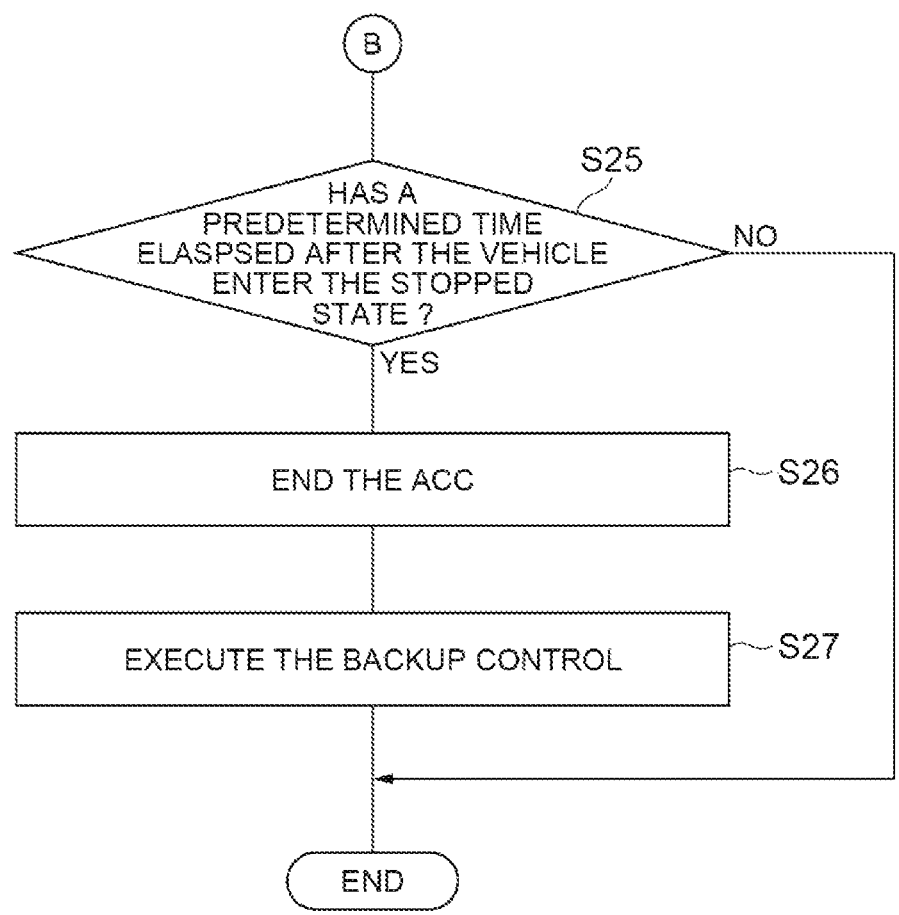
FIG. 4 is a flowchart illustrating an example of a process of maintaining the stop of the vehicle.

Next, a processing method of the vehicle stop holding device 100 according to the present embodiment will be described. FIGS. 2 to 4 are flowcharts illustrating an example of a process of maintaining the stop of the vehicle 1. The ECU10 periodically executes a process of determining whether or not the backup control can be realized by the brake holding device 6. More specifically, in the process of maintaining the stopped state of the vehicle 1, the processes of S10 to S27 are repeatedly executed.

As shown in FIG. 2, in the S10, the ECU10 determines whether or not the ACC is being executed. If it is determined that the ACC is being executed (S10: YES), the ECU10 transitions to S11. When it is determined that the ACC control is not being executed (S10: NO), the ECU10 ends the process of maintaining the stop of the vehicle 1 in the present cycle, and proceeds to S10 in the next cycle.

Subsequently, in the S11, the ECU10 determines whether or not the vehicle 1 is in a stopped state (following stop). For example, the ECU10 acquires information indicating the speed of the vehicle 1 from a speed sensor included in the internal sensor 2, and determines whether the vehicle 1 is in a stopped state. When it is determined that the vehicle 1 is in a stopped state (S11: YES), the ECU10 transitions to S12. When it is determined that the vehicle 1 is not in the stopped state (S11: NO), the ECU10 ends the process of maintaining the stop of the vehicle 1 in the present cycle and proceeds to the S10 in the next cycle.

Subsequently, in the S12, the ECU10 determines whether or not it is determined that the backup control cannot be executed before stopping the vehicle 1 by the brake device 5. When it is determined that the backup control cannot be executed before the ECU10 stops the vehicle 1 by the brake device 5 (S12: YES), the ECU10 proceeds to S13. If it is not determined that the backup control cannot be executed before the ECU10 stops the vehicle 1 by the brake device 5 (S12: NO), the ECU10 proceeds to S15 (see FIG. 3).

Subsequently, in S13, the ECU10 ends the ACC. Finally, in the S14, after the takeover control is executed, the ECU10 ends the process of holding the stopped state of the vehicles 1 in the present cycle and transitions to S10 in the next cycle. As described above, when it is determined that the backup control cannot be implemented before the vehicle 1 stops, the braking force of the brake device 5 is changed and the operation of the brake device 5 is handed over to the driver.

As shown in FIG. 3, in the S15, the ECU10 determines whether or not it is determined that the backup control cannot be executed after the ECU10 stops the vehicle 1 by the brake device 5. When it is determined that the backup control cannot be executed after the ECU10 stops the vehicle 1 by the brake device 5 (S15: YES), the ECU10 proceeds to S16. When it is not determined that the backup control cannot be executed after the ECU10 stops the vehicle 1 by the brake device 5 (S15: NO), the ECU10 proceeds to S25.

Subsequently, in S16, the ECU10 ends the ACC. Subsequently, the ECU10 turns on the warning lamp in the S17. Subsequently, in the S18, the ECU10 determines whether or not the getting-off operation by the driver is detected. For example, the ECU10 determines whether or not the getting-off operation by the driver is detected based on information acquired from a seat belt sensor, a door opening/closing sensor, and the like included in the internal sensor 2. When it is determined that the getting-off operation by the driver is detected (S18: YES), ECU10 proceeds to S14 (see FIG. 2). When it is determined that the getting-off operation by the driver is not detected (S18: NO), ECU10 transitions to S19.

Subsequently, in the S19, the ECU10 determines whether or not an accelerator operation (operation of the accelerator device 4) or a brake operation (operation of the brake device 5) by the driver is detected. For example, the ECU10 determines whether or not an accelerator operation or a brake operation by the driver is detected based on an operation amount of the accelerator device 4 acquired from an accelerator sensor included in the internal sensor 2 or an operation amount of the brake device 5 acquired from a brake sensor. When it is determined that the accelerator operation or the brake operation by the driver is detected (S19: YES), the ECU10 proceeds to S24. When it is determined that the accelerator operation or the brake operation by the driver is not detected (S19: NO), the ECU10 proceeds to S20.

Subsequently, in the S20, the ECU10 determines whether or not the grace time necessary for the takeover control has elapsed from the reference time. The reference time is a time after the vehicle 1 is stopped. The reference time may be, for example, a time after it is determined that the backup control cannot be realized in the S16. The reference time is, for example, a time at which a warning lamp is turned on in a S17. The reference time may be a time other than the above. The grace time is a time set in advance. The grace time may be a time set to secure the attention of the driver to the driving operation (driver engagement: driver coping performance). For example, the grace time may be a time during which it is possible to reliably and safely take over the operation of the brake device to the driver when the takeover control is executed after the grace time has elapsed. The grace time may exceed the time required for the driver to get off the vehicle (for example, 2 seconds).

When it is determined that the grace time necessary for the takeover control has elapsed from the reference time (S20: YES), ECU10 transitions to S21. Subsequently, the ECU10 performs takeover control in the S21, and transitions to the S24. In this way, the ECU10 gives a delay to the time until the driver takes over the operation of the brake device 5 (requests the change) in consideration of the change in the attentiveness of the driver to the driving operation while the vehicle 1 is stopped.

When it is determined that the grace time necessary for the takeover control has not elapsed from the reference time (S20: NO), the ECU10 transitions to S23. In S23, the ECU10 controls the brake device 5 to hold the vehicle 1 in a stopped state, and then transitions to S18. Finally, in the S24, after releasing the brake of the brake device 5, the ECU10 ends the process of holding the stopped state of the vehicles 1 in the present cycle and proceeds to the S10 in the next cycle.

As shown in FIG. 4, in the S25, the ECU10 determines whether or not a predetermined time has elapsed after the vehicle 1 enters the stopped state (following stopped state). When it is determined that the predetermined time has elapsed after the vehicle 1 is stopped (S25: YES), the ECU10 transitions to S26. In a case where it is determined that the predetermined time has not elapsed after the vehicle 1 enters the stopped state (S25: NO), the ECU10 ends the process of maintaining the stop of the vehicle 1 in the present cycle and transitions to the S10 in the next cycle. In this case, in step S25, the ECU10 ends the process of maintaining the stopped state of the vehicle 1 while maintaining the stopped state of the vehicle 1 (while holding the stopped state of the vehicle 1). Thereafter, the ECU10 performs S10 in the next cycle.

Subsequently, in S26, the ECU10 ends the ACC. Finally, after the backup control is executed in the S27, the ECU10 ends the process of holding the stopped state of the vehicles 1 in the present cycle and transitions to the S10 in the next cycle.

As described above, the vehicle stop holding device 100 that holds the stop of the vehicle 1, includes the ECU10 configured to execute the takeover control for taking over the operation of the brake device 5 to the driver after the ECU10 stops the vehicle 1 by the brake device 5 in case where it is determined that the backup control cannot be realized and the getting-off operation by the driver is detected and to execute the takeover control after the ECU10 stops the vehicle 1 by the brake device 5 when the grace time required for the takeover control has elapsed from the reference time after a determination in case where it is determined that the backup control cannot be implemented and the getting-off operation by the driver is not detected. Thus, when the backup control cannot be realized, the operation of the brake device 5 can be quickly taken over by the driver. As a result, it is possible to reliably maintain the stopped state of the vehicle 1.

Further, in the related art, when it is determined that the backup control cannot be realized during the ACC control, even if the driver gets off the vehicle, the stopped state of the vehicle 1 is continuously maintained by the hydraulic brake. In this case, when the hydraulic brake reaches the limit after the driver gets off the vehicle without performing the brake operation, the stop holding state of the vehicle 1 may not be able to be maintained. In this regard, in the vehicle stop holding device 100, after the ECU10 stops the vehicle 1 by the brake device 5, the takeover control is executed in a case where the backup control cannot be realized and the detection operation of getting off by the driver is detected. Thus, the operation of the brake device 5 can be reliably taken over to the driver before the driver gets off the vehicle. As a result, it is possible to reliably maintain the stopped state of the vehicle 1.

Further, since the operation of the vehicle navigation system or the air conditioner is executed after the driver stops the vehicle 1, the attention of the driver to the driving operation is temporarily reduced as compared to during the traveling of the vehicle 1 and immediately after the stop of the vehicle 1. In the vehicle stop holding device 100, when it is determined that the backup control cannot be realized and the getting-off operation by the driver is not detected after the ECU10 stops the vehicle 1 by the brake device 5, the takeover control is executed after the lapse of the grace time. Accordingly, when the timing at which it is determined that the backup control cannot be realized is after the vehicle 1 stops, the operation of the brake device 5 can be taken over to the driver at the timing at which the attention of the driver to the driving operation is recovered in consideration of the attention and, for example, by appropriately changing the grace time. As a result, the brake operation can be taken over safely and without anxiety for the driver. In addition, after the ECU10 stops vehicle 1 by the brake device 5, in a case where the backup control cannot be realized and getting out by the driver is detected, it is possible to quickly take over the operation of the brake device 5 to the driver. Thus, when the driver performs the getting-off operation, it is possible to quickly take over the operation of the brake device 5 to the driver by assuming that the attention of the driver to the driving operation is sufficiently high (the driver engagement is secured). As a result, it is possible to suppress the vehicle 1 from moving in an unmanned state. As described above, it is possible to more reliably maintain the stop holding state of the vehicle 1 in consideration of the change in the attention of the driver to the driving operation before and after the stop of the vehicle 1.

According to the vehicle-stop holding device 100, before the ECU10 stops the vehicle 1 by the brake device 5 in case where the ECU10 determines that the backup control cannot be implemented, the ECU10 configured to execute the takeover control. In this case, when the backup control cannot be realized and the attention of the driver is sufficiently high (the driver engagement is secured), the operation of the brake device 5 can be promptly taken over to the driver. Thus, it is possible to reliably maintain the stopped state of the vehicle 1.

According to the vehicle-stop holding device 100, the ECU10 configured to control the braking force applied to the vehicles 1 by the brake devices 5 in the takeover control, to change the braking force in the first pattern in the takeover control after the ECU10 stops the vehicles 1 by the brake devices 5, and to change the braking force in the second pattern different from the first pattern in the takeover control before the vehicles 1 are stopped by the brake devices 5. In this case, the braking force is changed in the takeover control in consideration of the attention of the driver to the driving operation. For example, in a case where the takeover control is performed before the ECU10 stops the vehicle 1, the braking force of the brake device 5 is gradually reduced to 0 in consideration that the driver's attention to the driving operation is high (it can be confirmed that the driver engagement is secured), and then the operation of the brake device 5 is taken over to the driver. In addition, for example, in a case where the takeover control is performed after the ECU10 stops the vehicle 1, a sufficient grace time is given to the driver to wait for the driver's attention to the driving operation to be recovered. However, since it is unclear (unconfirmed) whether or not the attention of the driver to the driving operation is recovered after the lapse of the grace time, the operation of the brake device 5 is handed over to the driver after the attention of the driver is reliably recovered by repeatedly increasing and decreasing the braking force of the brake device 5. As a result, the operation of the brake device 5 can be reliably taken over to the driver. As described above, it is possible to reliably maintain the stopped state of the vehicle 1.

According to the vehicle-stop holding device 100, the ECU10 configured to notify the driver of the remaining time until the grace time elapses. This makes it possible to direct the attention of the driver to the driving operation. Thus, the driver's attention to the driving operation can be recovered. As a result, it is possible to reliably maintain the stopped state of the vehicle 1.

Although the embodiments have been described above, one aspect of the present disclosure is not limited to the above-described embodiments, and various modifications can be made without departing from the spirit of the invention.

In the above-described embodiment, the ECU10 configured to execute the takeover control after stopping the vehicle 1 by the brake device 5 when the grace time necessary for the takeover control has elapsed from the reference time after a determination in case where the ECU10 determines that the backup control cannot be implemented and does not detect the getting-off operation by the driver. For example the ECU10 may execute the takeover control when it is determined that the stop of the vehicle 1 by the brake device 5 cannot be continued after the ECU10 stops the vehicle 1 by the brake device 5 in a case where it is determined that the backup control cannot be realized and the getting-off operation by the driver is not detected. Note that the ECU10 may determine that the stopping of the vehicle 1 cannot be continued, for example, when a limit time for holding the stopped state of the vehicle 1 by the hydraulic brake has elapsed. In this case, the limit time may be set for each type of vehicle 1. Further, for example, the ECU10 may determine that the stopping of the vehicle 1 cannot be continued when the hydraulic brake detects that the stopped state of the vehicle 1 cannot be maintained.

As shown in FIG. 5, in the process of holding the stopped state of the vehicle 1 in the modified example, instead of determining whether or not the grace time necessary for the takeover control has elapsed from the reference time in the S20, it may be determined whether or not the stop of the vehicle 1 by the brake device 5 can be continued in the S28. When it is determined that the stopping of the vehicle 1 by the brake device 5 can be continued (S28: YES), the ECU10 may shift to S23. When it is determined that the stopping of the vehicle 1 by the brake device 5 cannot be continued (S28: NO), the ECU10 may shift to S21 and S24.

In the above-described embodiment, in the takeover control, the ECU10 changes the braking force of the brake device 5 in a predetermined pattern (executes the brake release control), but the present disclosure is not limited thereto. For example, in the takeover control, instead of or in addition to the brake release control, the ECU10 may further execute notification control for controlling the HMI7 to output a notification for requesting the occupant to perform a brake operation. For example, as notification control, the ECU10 may cause the display 7a to display a brake operation request to the driver.

Each configuration in the above-described embodiment or modified example can be arbitrarily applied to each configuration in other embodiments or modified examples. A part of each configuration in the above-described embodiment or modification may be omitted as appropriate without departing from the gist of one aspect of the present disclosure.

What is claimed is:

1. A vehicle stop holding device that holds a stop of a vehicle, comprising:

A controller configured to execute takeover control for taking over an operation of a brake device to a driver after the controller stops the vehicle by the brake device in case where it is determined that backup control for holding a stop state of the vehicle by a brake holding device cannot be realized and a getting-off operation by the driver is detected, and to execute the takeover control after the controller stops the vehicle by the brake device when a grace time required for the takeover control elapses from a reference time after a determination in case where it is determined that backup control for holding a stop state of the vehicle by the brake holding device cannot be realized and a getting-off operation by the driver is not detected.

2. The vehicle stop holding device according to claim 1, wherein the controller configured to execute the takeover control before the controller stops the vehicle by the brake device in case where it is determined that the backup control cannot be implemented.

3. The vehicle stop holding device according to claim 2, wherein the controller configured to control a braking force applied to the vehicle by the brake device in the takeover control, to change the braking force in a first pattern in the takeover control after the controller stops the vehicle by the brake device, and to change the braking force in a second pattern different from the first pattern in the takeover control before the controller stops the vehicle by the brake device.

4. The vehicle stop holding device according to claim 1, wherein the controller configured to notify a driver of a remaining time until the grace time elapses.

5. The vehicle stop holding device according to claim 2, wherein the controller configured to notify a driver of a remaining time until the grace time elapses.

6. The vehicle stop holding device according to claim 3, wherein the controller configured to notify a driver of a remaining time until the grace time elapses.

7. A vehicle stop holding device that holds a stop of a vehicle, comprising:

A controller configured to execute takeover control for taking over operation of a brake device to a driver after the controller stops the vehicle by the brake device in case where it is determined that backup control for holding a stop state of the vehicle by a brake holding device cannot be realized and a getting-off operation by the driver is detected, and to execute the takeover control when it is determined that stop of the vehicle by the brake device cannot be continued after the controller stops the vehicle by the brake device in case where it is determined that the backup control cannot be realized and a getting-off operation by the driver is not detected.

* * * * *